(12) United States Patent
Dyson et al.

(10) Patent No.: US 10,933,481 B2
(45) Date of Patent: Mar. 2, 2021

(54) METHOD OF FORMING COOLING PASSAGE FOR TURBINE COMPONENT WITH CAP ELEMENT

(71) Applicant: General Electric Company, Schenectady, NY (US)

(72) Inventors: Thomas Earl Dyson, Niskayuna, NY (US); Jason Ray Gregg, Greenville, SC (US); Nicholas William Rathay, Rock City Falls, NY (US)

(73) Assignee: General Electric Company, Schenectady, NY (US)

( * ) Notice: Subject to any disclaimer, the term of this patent is extended or adjusted under 35 U.S.C. 154(b) by 333 days.

(21) Appl. No.: 15/862,927

(22) Filed: Jan. 5, 2018

(65) Prior Publication Data
US 2019/0210132 A1   Jul. 11, 2019

(51) Int. Cl.
*B23H 9/10* (2006.01)
*F01D 5/18* (2006.01)
(Continued)

(52) U.S. Cl.
CPC ............... *B23H 9/10* (2013.01); *F01D 5/143* (2013.01); *F01D 5/147* (2013.01); *F01D 5/18* (2013.01);
(Continued)

(58) Field of Classification Search
CPC ........ F01D 5/186; F01D 5/187; Y02T 50/676; B23P 15/02
See application file for complete search history.

(56) References Cited

U.S. PATENT DOCUMENTS 3,525,486 A * 8/1970 Wimpenny ............. B64C 23/06
 244/204.1
4,128,928 A * 12/1978 Shotts ...................... B23P 15/02
 29/557
(Continued)

FOREIGN PATENT DOCUMENTS

CA   2336883 A1 * 1/2000 ............. F01D 5/186
EP   2559855 A2   2/2013
(Continued)

OTHER PUBLICATIONS

S. Bunker, "A Review of Shaped Hole Turbine Film-Cooling Technology", Journal of Heat Transfer, vol. 127, Issue: 4, pp. 441-453, Mar. 30, 2005.
(Continued)

*Primary Examiner* — Jacob J Cigna
(74) *Attorney, Agent, or Firm* — Charlotte C. Wilson; James W. Pemrick

(57) ABSTRACT

Methods of forming a cooling passage on a turbine component having a component wall with an internal surface and an external surface, are disclosed. An opening is formed passing through the component wall and fluidly connecting the internal and external surfaces. The opening includes a metering section extending from the internal surface to a metering end, and a diffuser area extending from the metering end to the external surface. A preformed cap element is added to close a portion of the diffuser area to form the cooling passage with a diffusion section extending from the metering end to the external surface. The preformed metal cap element includes a projection extending internally of the external surface and into the diffusion area to define an internally facing section of the diffusion section. The cooling passage extends through the component wall and fluidly connects the internal surface and the external surface.

15 Claims, 10 Drawing Sheets

(51) Int. Cl.
  *F01D 5/14* (2006.01)
  *F01D 9/04* (2006.01)
  *F01D 25/12* (2006.01)
  *F01D 5/28* (2006.01)

(52) U.S. Cl.
  CPC ............ *F01D 5/186* (2013.01); *F01D 5/187* (2013.01); *F01D 5/288* (2013.01); *F01D 9/041* (2013.01); *F01D 25/12* (2013.01); *F05D 2220/32* (2013.01); *F05D 2230/10* (2013.01); *F05D 2230/237* (2013.01); *F05D 2230/50* (2013.01); *F05D 2230/60* (2013.01); *F05D 2230/90* (2013.01); *F05D 2240/12* (2013.01); *F05D 2240/24* (2013.01); *F05D 2260/202* (2013.01)

(56) References Cited

U.S. PATENT DOCUMENTS

| | | | |
|---|---|---|---|
| 4,653,983 A | 3/1987 | Vehr | |
| 4,684,323 A * | 8/1987 | Field | F01D 5/186 415/115 |
| 6,210,488 B1 * | 4/2001 | Bruce | B08B 3/12 134/1 |
| 6,368,060 B1 * | 4/2002 | Fehrenbach | F01D 5/186 416/97 A |
| 6,955,522 B2 | 10/2005 | Cunha et al. | |
| 7,273,351 B2 | 9/2007 | Kopmels | |
| 7,997,868 B1 * | 8/2011 | Liang | F01D 5/186 416/97 R |
| 8,047,789 B1 * | 11/2011 | Liang | F01D 5/147 416/97 R |
| 8,057,183 B1 * | 11/2011 | Liang | F01D 5/187 416/96 A |
| 8,092,176 B2 * | 1/2012 | Liang | F01D 5/186 416/231 R |
| 8,109,726 B2 * | 2/2012 | Liang | F01D 5/187 416/97 R |
| 8,168,912 B1 | 5/2012 | Liang | |
| 8,591,191 B1 | 11/2013 | Liang | |
| 8,672,613 B2 * | 3/2014 | Bunker | F01D 5/186 415/115 |
| 8,777,571 B1 | 7/2014 | Liang | |
| 8,814,500 B1 | 8/2014 | Liang | |
| 8,851,848 B1 | 10/2014 | Liang | |
| 8,938,879 B2 | 1/2015 | Bunker | |
| 9,133,716 B2 | 9/2015 | Liang | |
| 9,181,819 B2 | 11/2015 | Lee et al. | |
| 9,188,012 B2 | 11/2015 | Lacy et al. | |
| 9,206,696 B2 | 12/2015 | Bunker et al. | |
| 9,327,384 B2 | 5/2016 | Bunker | |
| 9,394,796 B2 * | 7/2016 | Lacy | F01D 5/288 |
| 9,416,662 B2 | 8/2016 | Morgan et al. | |
| 9,441,488 B1 | 9/2016 | Johnson | |
| 9,458,725 B2 | 10/2016 | Morgan et al. | |
| 9,770,785 B2 | 9/2017 | Hu et al. | |
| 9,828,915 B2 * | 11/2017 | Miranda | F01D 5/187 |
| 9,951,647 B2 | 4/2018 | Rawson | |
| 2005/0123401 A1 * | 6/2005 | Bunker | F01D 5/186 416/97 R |
| 2009/0074588 A1 * | 3/2009 | Scott | F01D 5/186 416/96 R |
| 2009/0169394 A1 | 7/2009 | Crow et al. | |
| 2010/0040459 A1 * | 2/2010 | Ohkita | F01D 5/186 415/177 |
| 2011/0293423 A1 * | 12/2011 | Bunker | F01D 5/186 416/95 |
| 2012/0167389 A1 * | 7/2012 | Lacy | B23P 6/002 29/889.1 |
| 2013/0205790 A1 * | 8/2013 | Xu | F01D 5/186 60/754 |
| 2013/0205791 A1 * | 8/2013 | Mongillo, Jr. | F01D 5/186 60/754 |
| 2013/0209227 A1 * | 8/2013 | Xu | F01D 5/186 415/115 |
| 2014/0294598 A1 * | 10/2014 | Nita | F01D 5/186 416/97 R |
| 2015/0017018 A1 * | 1/2015 | Lacy | F01D 5/288 416/97 R |
| 2016/0003056 A1 | 1/2016 | Xu | |
| 2016/0008889 A1 | 1/2016 | Xu | |
| 2016/0032766 A1 | 2/2016 | Bunker et al. | |
| 2016/0177733 A1 | 6/2016 | Lewis et al. | |
| 2016/0186577 A1 | 6/2016 | Willett, Jr. | |
| 2016/0201474 A1 | 7/2016 | Slavens et al. | |
| 2016/0363054 A1 * | 12/2016 | Miranda | F01D 5/187 |
| 2017/0129013 A1 | 5/2017 | Bunker | |
| 2017/0129014 A1 | 5/2017 | Bunker | |
| 2017/0145830 A1 | 5/2017 | Jacala et al. | |
| 2017/0175569 A1 | 6/2017 | Rawson | |
| 2018/0171804 A1 * | 6/2018 | Friedrich | F01D 5/087 |
| 2018/0171872 A1 | 6/2018 | Dyson et al. | |

FOREIGN PATENT DOCUMENTS

| | | |
|---|---|---|
| EP | 2537606 B1 | 2/2016 |
| EP | 3034782 A1 | 6/2016 |
| JP | 2010144578 A | 7/2010 |
| WO | WO-2018141739 A1 * | 8/2018 ............ F01D 5/186 |

OTHER PUBLICATIONS

Li et al., "Rapid casting of turbine blades with abnormal film cooling holes using integral ceramic casting molds", the International Journal of Advanced Manufacturing Technology, vol. 50, Issue: 1-4, pp. 13-19, Sep. 2010.

Final Office Action received for U.S. Appl. No. 15/379,988 dated Aug. 8, 2019 (18 pages).

* cited by examiner

METHOD OF FORMING COOLING PASSAGE FOR TURBINE COMPONENT WITH CAP ELEMENT

CROSS-REFERENCE TO RELATED APPLICATIONS

This application is related to U.S. application Ser. No. 15/862,932, filed concurrently and currently pending.

BACKGROUND OF THE INVENTION

The disclosure relates generally to turbine component cooling, and more particularly, to methods of forming a cooling passage for a turbine component with a metal cap element, and a turbine component so formed.

The airfoils of gas turbine blades and nozzles are exposed to excessive heat loads. Airfoils are typically covered with a high concentration of a thermal barrier coating (TBC). Consequently, the TBC experiences spalls, which makes cooling the airfoils more difficult. In order to cool the airfoils, a coolant is typically introduced through cooling passages from an interior chamber of the airfoil through holes to an exterior surface of the airfoil. The cooling passages are arranged in large numbers, which creates many holes in the airfoil. At the leading edge, cooling passage arrangements may be referred to as a showerhead arrangement. Ideally, the coolant creates a cooling film, i.e., a flow across and close to the surface of the airfoil, which extends downstream along a surface of the airfoil.

On the leading edge, cooling passages with traditional round or conical shaped exit holes are radially oriented relative to the surface, i.e., they are drilled perpendicularly relative to the hot gas flow direction. Consequently, the cooling flow has to make a sharp turn and is susceptible to blowing off of the airfoil surface, which may reduce the coolant coverage and laterally-averaged cooling effectiveness. Cooling passages having shaped diffusion exit holes are typically used in other regions on the airfoil and have a relatively high cooling effectiveness, but have not been successfully used in the leading edge because of the small radius of curvature of the leading edge. That is, the shaped diffusion exit holes need to be drilled nearly perpendicular to the surface using traditional manufacturing methods. This arrangement results in reduced cooling performance. Regardless of location, complex film cooling passage geometries are frequently difficult to manufacture with conventional drilling.

In addition to the above challenges, there is an increased need to reduce overall coolant usage to increase turbine efficiency while maintaining acceptable part temperature. In order to reduce overall cooling flows, fewer cooling passages are typically used, resulting in increased spacing between holes. Each cooling passage must therefore have increased laterally-averaged cooling effectiveness and increased lateral coolant coverage. One approach to provide this functionality is to create precise cooling passage structure, but it is very difficult to customize internal component wall structure, e.g., where no line of sight is provided. Many advanced film designs rely on additive manufacturing to create improved cooling passages, but there are many challenges that need to be overcome before this technology can be put into widespread use in the hot gas path section.

BRIEF DESCRIPTION OF THE INVENTION

A first aspect of the disclosure provides a method of forming a cooling passage on a turbine component having a component wall with an internal surface and an external surface, the method including: forming an opening passing through the component wall and fluidly connecting the internal surface and the external surface, the opening including a metering section extending from the internal surface to a metering end, and a diffuser area extending from the metering end to the external surface; and adding a preformed metal cap element across a portion of the diffusion area of the opening to close the portion of the diffuser area to form the cooling passage with a diffusion section extending from the metering end to the external surface, the metal cap element material including a projection extending internally of the external surface of the component wall and into the diffusion area to define an internally facing section of the diffusion section, wherein the cooling passage extends through the component wall and fluidly connects the internal surface and the external surface.

A second aspect of the disclosure provides a method of forming a cooling passage on a turbine component having a component wall with an internal surface and an external surface, the method including: forming an opening passing through the component wall and fluidly connecting the internal surface and the external surface, the opening including a metering section extending from the internal surface to a metering end, and a diffuser area extending from the metering end toward the external surface; adding metal cap element material to close the diffuser area of the opening at the exterior surface and define a diffusion section extending from the metering end to the external surface, the metal cap element material including a projection extending internally of the external surface of the component wall and into the diffusion area to define an internally facing section of the diffusion section; and allowing a section of the metal cap element material to be removed to form the cooling passage, the cooling passage extending through the metal cap element material and the component wall to fluidly connect the internal surface and the external surface.

A third aspect of the disclosure provides a turbine component, including: a component wall with an internal surface and an external surface; and a cooling passage including: an opening defining a metering section extending from the internal surface to a metering end, and defining an inner portion of a diffuser section that extends from the metering section to the external surface, and a metal cap element closing a portion of the opening, the metal cap element including a projection extending internally of the external surface of the component wall to define an internally facing section of the diffusion section, wherein a first cross-sectional area of the diffuser section at the metering end is different than a second cross-sectional area of the diffuser section at the external surface.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
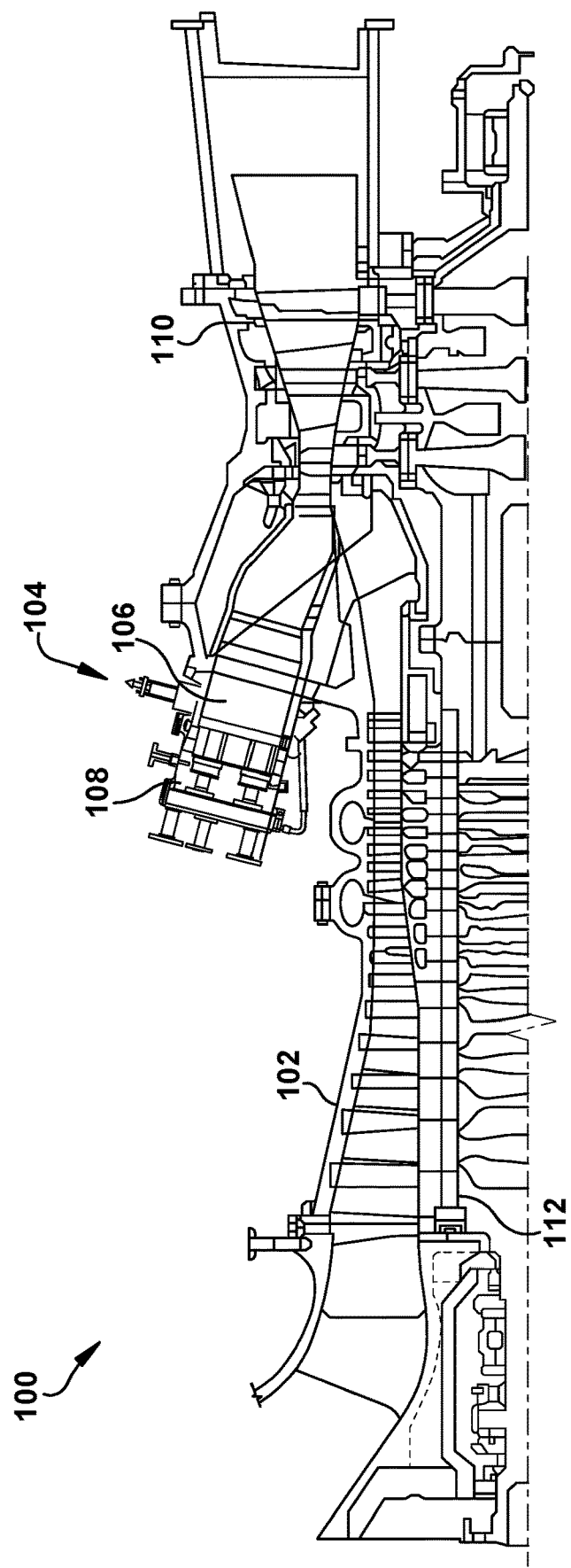
FIG. 1 shows a schematic view of an illustrative turbomachine in the form of a gas turbine system.

As an initial matter, in order to clearly describe the current disclosure it will become necessary to select certain terminology when referring to and describing relevant machine components within a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine and across an external surface of a turbine component or, for example, the flow of air through the combustor. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Embodiments of the disclosure provide methods of forming a cooling passage on a turbine component having a component wall with an internal surface and an external surface. An opening is formed passing through the component wall and fluidly connecting the internal surface and the external surface. The opening may include a metering section extending from the internal surface to a metering end, and a diffuser area extending from the metering end to the external surface. Metal cap element material is added to close a portion of the diffuser area to form the cooling passage with a diffusion section extending from the metering end to the external surface. The metal cap element material includes a projection extending internally of the external surface of the component wall and into the diffusion area to define an internally facing section of the diffusion section. Thus, the metal cap element material can have an interior surface thereof shaped to customize a diffusion section of the cooling passage in a manner unavailable with conventional drilling. While additive manufacturing could create the shapes, it is incapable of using the alloys and/or achieving the crystalline structure of the material required for use in a turbomachine. The cooling passage extends through the component wall and fluidly connects the internal surface and the external surface. Another method provides a closed cooling passage capable of adaptive cooling during operation of the turbomachine. The methods enable more complex shaped cooling passages, thus allowing their use on components which require single crystal alloys or other materials that cannot be printed. The cooling passages can be applied in a leading edge wall of the turbine component, among other locations. The turbine component including a cooling passage created by the methods, e.g., at a leading edge wall, exhibits improved averaged film cooling effectiveness and increased coolant coverage compared to conventional showerhead arrangements, which may increase combined cycle efficiency and improved part durability.

FIG. 1 shows a schematic illustration of an illustrative industrial machine including a turbine airfoil to which teachings of the disclosure may be applied. In the example, the machine includes a turbomachine 100 in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft 112 (sometimes referred to as a rotor 112). In one embodiment, the combustion turbine system is a MS7001FB engine, sometimes referred to as a 7FB engine, commercially available from General Electric Company, Greenville, S.C. The present disclosure is not limited to any one particular industrial machine, nor is it limited to any particular gas turbine system and may be implanted in connection with other engines including, for example, the MS7001FA (7FA), the MS9001FA (9FA), the 7HA and the 9HA, the GEnx 1B76, GE90-115Bengine models of General Electric Company. Furthermore, the present disclosure is not limited to any particular turbomachine, and may be applicable to any turbine airfoil requiring film cooling of a leading edge thereof in, for example, steam turbines, jet engines, compressors, turbofans, etc.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine that rotatably couples to and drives rotor 112. Compressor 102 also is rotatably coupled to rotor 112. In the illustrative embodiment, there is a plurality of combustors 104 and fuel nozzle assemblies 108.

Figure 2:
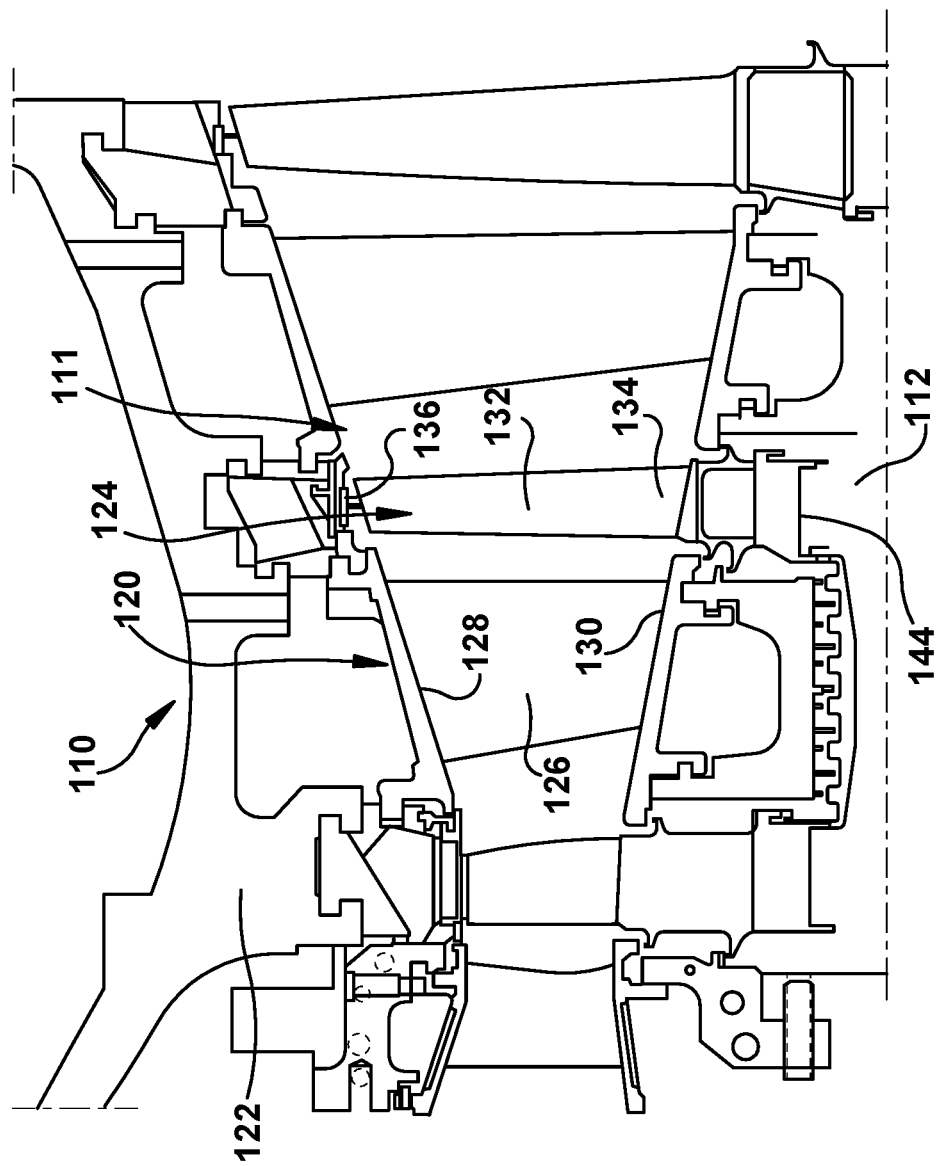
FIG. 2 shows a cross-sectional view of an illustrative gas turbine assembly that may be used with the gas turbine system in FIG. 1.

FIG. 2 shows a cross-sectional view of an illustrative turbine assembly 110 of turbomachine 100 (FIG. 1) that may be used with the gas turbine system in FIG. 1. A turbine 111 of turbine assembly 110 includes a row of nozzles or vanes 120 coupled to a stationary casing 122 of turbomachine 100 and axially adjacent a row of rotating blades 124. A nozzle or vane 126 may be held in turbine assembly 110 by a radially outer platform 128 and a radially inner platform 130. Row of blades 124 in turbine assembly 110 includes rotating blades 132 coupled to rotor 112 and rotating with the rotor. Rotating blades 132 may include a radially inward platform 134 (at root of blade) coupled to rotor 112 and a radially outward tip shroud 136 (at tip of blade).

Figure 3:
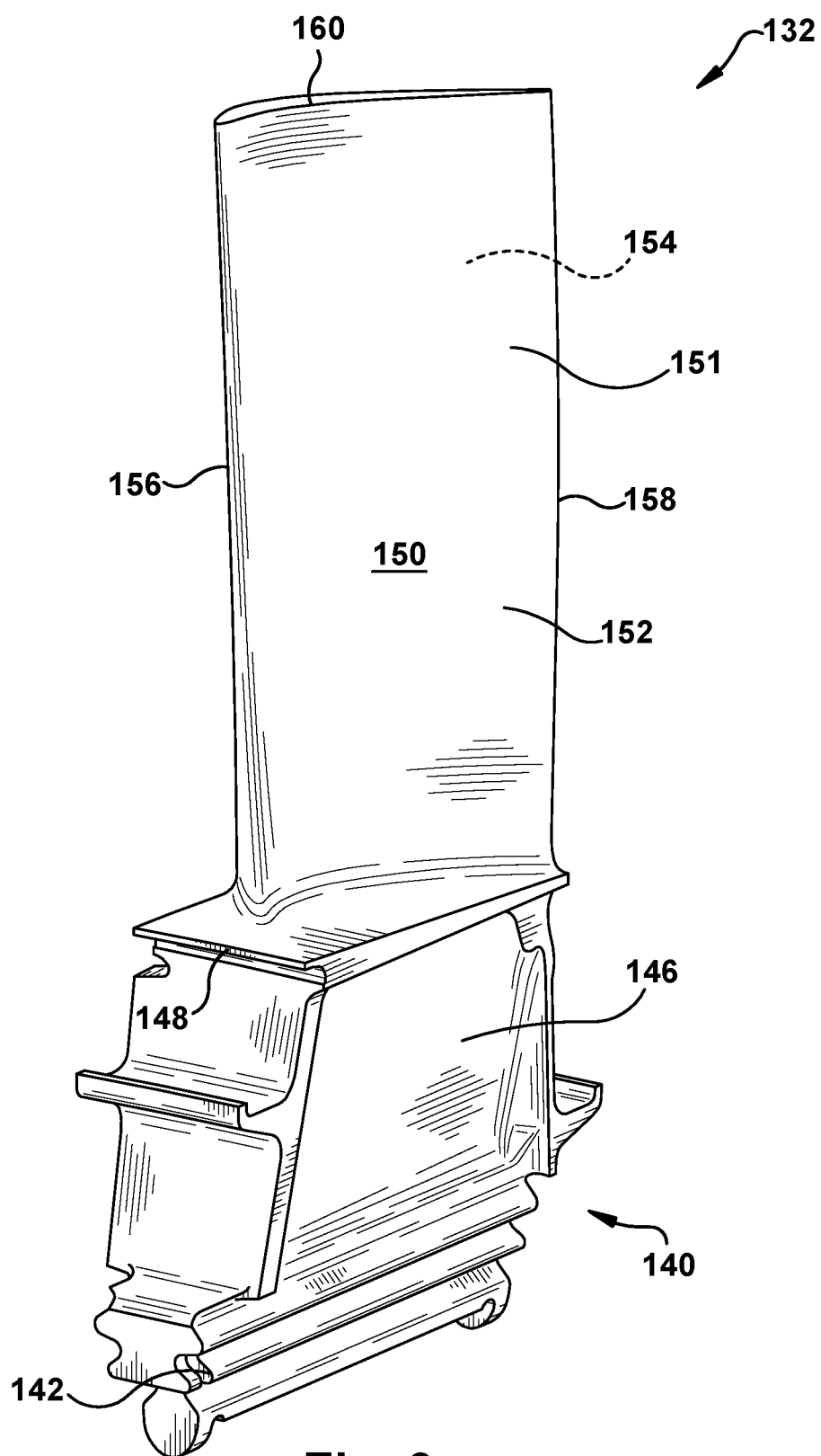
FIG. 3 shows a perspective view of a turbine rotor blade of the type in which embodiments of the present disclosure may be employed.
Figure 4:
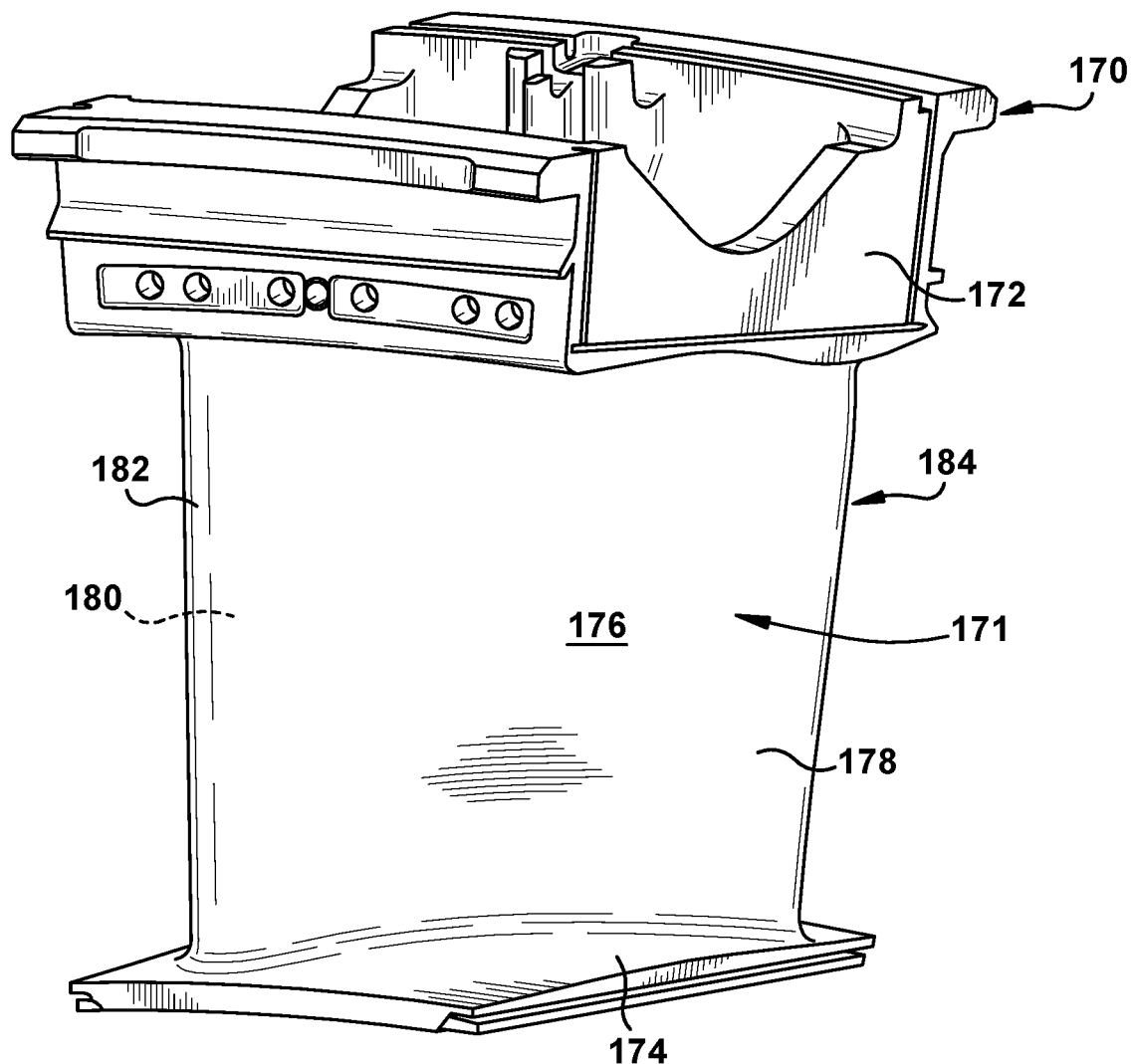
FIG. 4 shows a perspective view of a turbine vane of the type in which embodiments of the present disclosure may be employed.

FIGS. 3 and 4 show illustrative hot gas path turbine components (including turbine airfoils) of a turbomachine in which teachings of the disclosure may be employed. FIG. 3 shows a perspective view of a rotating blade 132 of the type in which embodiments of the present disclosure may be employed. Rotating blade 132 includes airfoil 150 having a body 151 with a root or base 140 by which rotating blade 132 attaches to rotor 112 (FIG. 2). Base 140 may include a dovetail 142 configured for mounting in a corresponding dovetail slot in the perimeter of a rotor wheel 144 (FIG. 2) of rotor 112 (FIG. 2). Base 140 may further include a shank 146 that extends between dovetail 142 and a platform 148, which is disposed at the junction of airfoil 150 and base 140 and defines a portion of the inboard boundary of the flow path through turbine assembly 110. It will be appreciated that airfoil 150 is the active component of rotating blade 132 that intercepts the flow of working fluid and induces the rotor disc to rotate. It will be seen that body 151 of airfoil 150 includes a concave pressure sidewall (PS) 152 and a circumferentially or laterally opposite convex suction sidewall (SS) 154 extending axially between opposite leading and trailing edges 156, 158 respectively. Sidewalls 152 and 154 also extend in the radial direction from platform 148 to an outboard tip 160.

FIG. 4 shows a perspective view of a stationary vane 170 of the type in which embodiments of the present disclosure may be employed. Stationary vane 170 includes an outer platform 172 by which stationary vane 170 attaches to stationary casing 122 (FIG. 2) of the turbomachine. Outer platform 172 may include any now known or later developed mounting configuration for mounting in a corresponding mount in the casing. Stationary vane 170 may further include an inner platform 174 (similar to tip 160 (FIG. 3)) for sealing the flow-path against blade platform 148, preventing hot gas flow into the rotor space. Platforms 172, 174 define respective portions of the outboard and inboard boundary of the flow path through turbine assembly 110. It will be appreciated that airfoil 176 is the active component of stationary vane 170 that intercepts the flow of working fluid and directs it towards rotating blades 132 (FIG. 3). It will be seen that airfoil 176 of stationary vane 170 includes a body 171 having a concave pressure sidewall (PS) 178 and a circumferentially or laterally opposite convex suction sidewall (SS) 180 extending axially between opposite leading and trailing edges 182, 184 respectively. Sidewalls 178 and 180 also extend in the radial direction from platform 172 to platform 174. Embodiments of the disclosure described herein may include aspects applicable to turbine airfoils of turbine rotating blade 132 and/or stationary vane 170. It is understood that other features of rotating blade 132 or stationary vane 170, not described herein such as but not limited to: internal cooling structures, cutout shape, outer wall angling/shape, etc., may be customized for the particular application, i.e., rotor blade or vane.

FIGS. 5-16 show various cross-sectional views of steps of forming a cooling passage according to embodiments of the disclosure. A turbine component upon which the methods can be applied may include, for example, any of the herein described rotating blades 132 or stationary vanes 170. Further, the cooling passages created for turbine component 200 may be employed with airfoils 150, 176, as previously described herein, as applied to a gas turbine system or any other industrial machine using a turbine component requiring cooling. In any event, the turbine component includes a component wall 210 with an internal surface 212 and an external surface 214. Component wall 210 may be used, for example, as a pressure sidewall or a suction sidewall of an airfoil extending between leading edge 156 (FIG. 3) and trailing edge 158 (FIG. 3), as described herein. In accordance with certain embodiments, component wall 210 in which cooling passages according to embodiments of the disclosure are applied is disposed in leading edge 156 (FIG. 3) (as a leading edge wall). As noted, the teachings of the disclosure may be applicable to other locations of component wall 210. In some embodiments, component wall 210 may include a metal or metal alloy depending on the application of the turbine component. Some examples include but are not limited to: Rene 108, CM247, Haynes alloys, Incalloy, MP98T, TMS alloys, CMSX single crystal alloys. As understood, a coolant chamber 216 may pass within component wall 210. Coolant chamber 216 may carry any form of coolant, e.g., air, from any source such as a compressor or other coolant chamber. As understood in the art, coolant chamber 216 can take a variety of forms and shapes within component wall 210. Component wall 210 and coolant chamber 216 may be formed using any now known or later developed process for forming turbine component such as but not limited to: casting and/or additive manufacturing.

Figure 5:
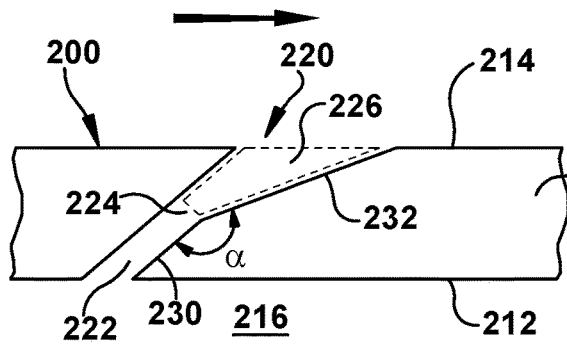
FIG. 5 shows a cross-sectional view of a step of a method of forming an opening for a cooling passage according to embodiments of the disclosure.
Figure 6:
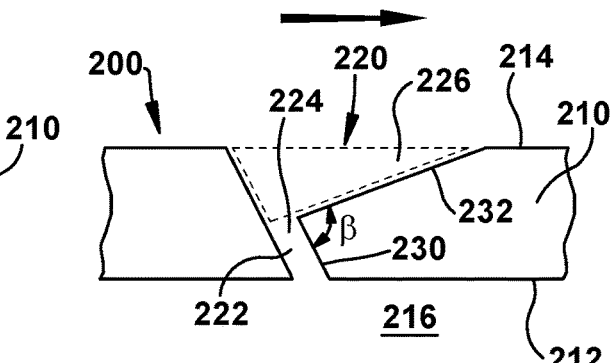
FIG. 6 shows a cross-sectional view of a step of a method of forming an opening for a cooling passage according to other embodiments of the disclosure.

FIGS. 5 and 6 show cross-sectional views of a first step of a method of forming a cooling passage according to one embodiment. As shown, an opening 220 is formed passing through component wall 210 and fluidly connecting internal surface 212 and external surface 214. Opening 220 may include a metering section 222 extending from internal surface 212 to a metering end 224. Metering section 222 may include any opening sized such as to meter, e.g., control flow volume, of coolant from coolant chamber 216. Metering section 222 may have any cross-sectional shape, e.g., circular, oblong, etc. Opening 220 also includes a diffuser area 226, shown with shadow box for clarity, extending from metering end 224 to external surface 214. Diffuser area 226 includes portions that eventually make up a diffuser section 242, but also perhaps portions of metering section 222 and/or metering end 224. Metering end 224 may include a location at which metering section 222 transitions, e.g., changes shape, to mate with diffuser area 226. As will be described in greater detail herein, diffuser area 226 (and, as will be described, diffuser section 242 formed therefrom) may have any shape capable of diffusing a coolant as it passes towards external surface 214, e.g., broadening or spreading a coolant flow and reducing its speed.

In FIGS. 5 and 6, an arrow shows a direction of working fluid flow across external surface 214 during operation of the turbine component. In the example, upstream is to the left and downstream is to the right. FIG. 5 shows a metering section 222 directed in a downstream direction of a working fluid flow across external surface 214 (i.e., with arrow), i.e., such that flow therein moves in a downstream direction. Diffuser area 226 is also directed in a downstream direction of the working fluid flow across external surface 214. Such an arrangement has a downstream side 230 of metering section 222 meet an inner side 232 of diffuser area 226 at an obtuse angle α. In contrast, FIG. 6 shows metering section 222 directed in an upstream direction of a working fluid flow across the external surface, i.e., against the arrow, and diffuser area 226 is directed in a downstream direction of the working fluid flow across the external surface, i.e., with the arrow. Such an arrangement has downstream side 230 of metering section 222 meet an inner side 232 of diffuser area 226 at an acute angle β. For purposes of further description, embodiments will show only the FIG. 6 embodiment; it is emphasized that teachings of the disclosure are applicable to any opening 220 having metering section 222 and diffuser area 226 meeting at any angle. In any event, opening 220 can be formed using any now known or later developed techniques such as but not limited to: casting, additive manufacturing, and/or machining such as drilling, directional drilling, grinding, etc. For example, metering section 222 can be formed by a first drilling, followed by a second drilling of diffuser area 226.

FIGS. 7-13 show cross-sectional views of various embodiments of adding metal cap element material 236 to close a portion of diffuser area 226 to form a cooling passage 240 with a diffuser section 242 extending from metering end 224 to external surface 214. Cooling passage 240 extends through component wall 210 and fluidly connects internal surface 212 and external surface 214. With brief reference to FIG. 8 and as will be described in greater detail, metal cap element material 236 may include a projection 244 extending internally of external surface 214 of component wall 210 (when in place) and into diffuser area 226 to define an internally facing section 246 of diffuser section 242. Internally facing section 246 creates an outermost shape of diffuser section 242. Regardless of embodiment, projection 244 can be shaped and sized to create a customized form of diffuser section 242. In this manner, complex shaped diffusion sections 242 can be created without additive manufacturing of the entirety of component wall 210 and without line of sight for, e.g., drilling or machining. Projection 244 can be shaped and sized to, for example, control coolant flow volume, flow rate, turbulence, direction, angle of exit, spreading (coverage), velocity, among other characteristics. Projection 244 can be straight, curved, dimpled, rough surfaced, and can provide any diffuser shape such as but not limited to a fan shape.

Figure 7:
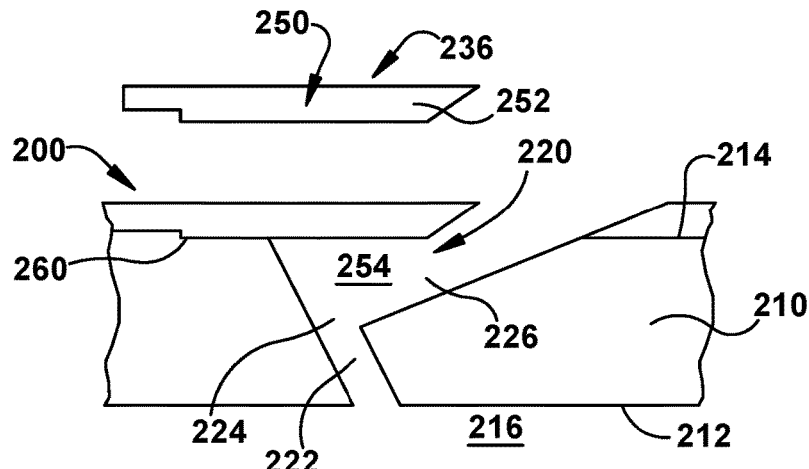
FIG. 7 shows a cross-sectional view of a step of a method of forming a cooling passage according to embodiments of the disclosure.
Figure 8:
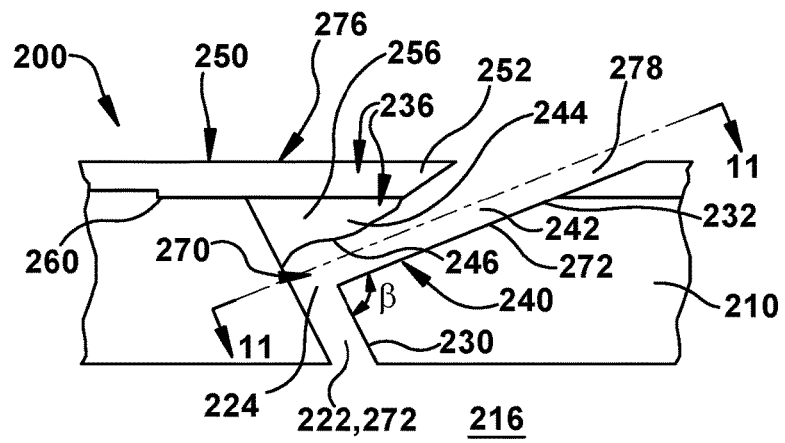
FIG. 8 shows a cross-sectional view of a step of a method of forming a cooling passage according to embodiments of the disclosure.
Figure 9:
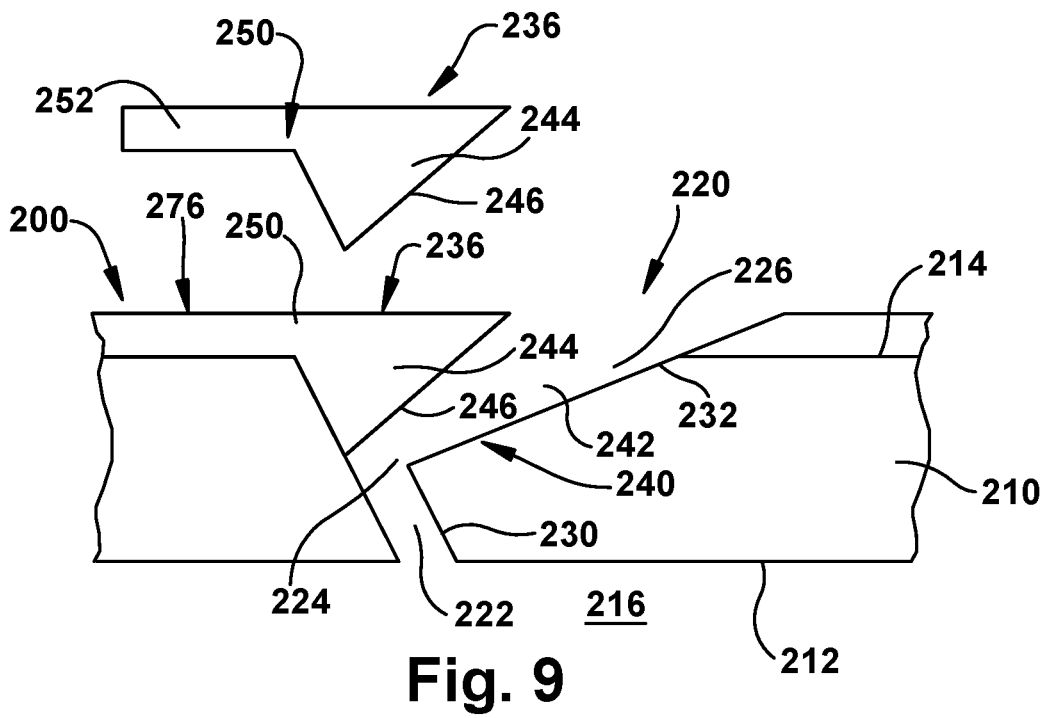
FIG. 9 shows a cross-sectional view of a step of a method of forming a cooling passage according to embodiments of the disclosure.

In embodiments, shown in FIGS. 7-9, adding metal cap element material 236 may include attaching a preformed metal cap element 250 across the portion of diffuser area 226 of opening 220. Preformed metal cap element 250 may include any metal or metal alloy compatible with component wall 210. The attaching may include any now known or later developed process compatible with the metals or metal alloys provided such as but not limited to brazing or welding.

In one embodiment, shown in FIGS. 7 and 8, metal cap element material 236 may be added in two parts. First, as shown in FIG. 7, preformed metal cap element 250 may include a backing element 252 extending across an external section 254 of diffuser area 226 of opening 220, which is attached into position, e.g., through brazing or welding. Second, as shown in FIG. 8, adding metal cap element material 236 may further include adding additional metal cap element material 256 to backing element 252, in position across external section 254, within diffuser area 226 to form projection 244 on backing element 252. In this manner, backing element 252 can be secured, and projection 244 added and shaped to further secure backing element 252. Additional metal cap element material 256 can be added in a number of ways such as but not limited to: brazing.

In another embodiment, shown in FIG. 9, preformed metal cap element 250 may include backing element 252 and projection 244 extending from backing element 252, i.e., prior to attachment across section 254 (FIG. 7) of diffuser area 226. Here, preformed metal cap element 250 is one unitary piece.

As will be understood relative to the FIGS. 7-9 embodiments, prior to the adding of metal cap element material 236, at least a portion of preformed metal cap element 250 may be formed by at least one of: brazing, additively manufacturing, and machining, i.e., separated from component wall 210. As noted, preformed metal cap element 250 may include any metal or metal alloy compatible with component wall 210.

As shown for example relative to the FIGS. 7 and 8 embodiments, forming opening 220 may also optionally include forming a metal cap element seat 260 about a portion of diffuser area 226 at external surface 214. As shown in FIGS. 7 and 8, preformed metal cap element 250 seats in the metal cap element seat 260, e.g., during the brazing and thereafter. Metal cap element seat 260 may extend any length about a portion of diffuser area 226 of opening 220 and have any shape desired to assist in positioning and holding preformed metal cap element 250.

Figure 10:
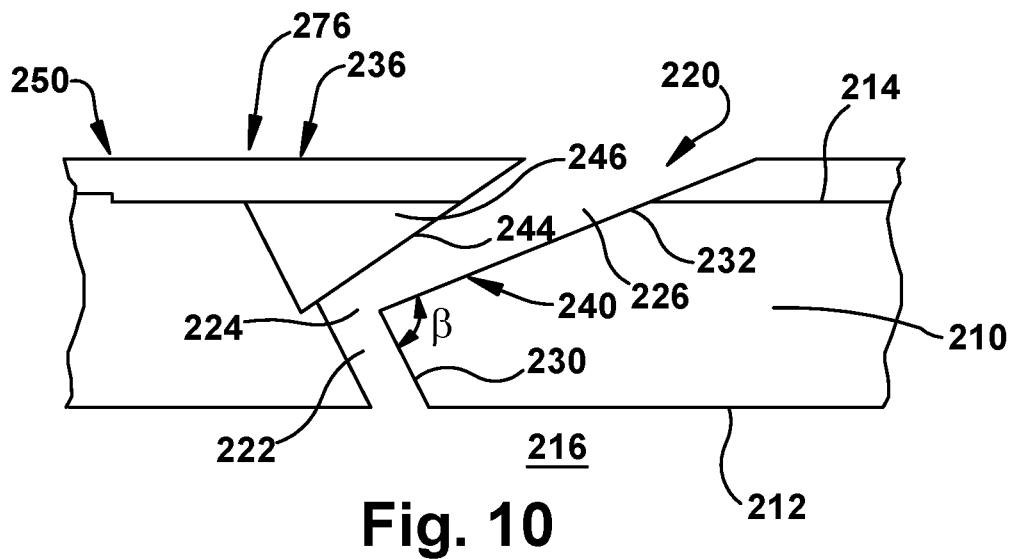
FIG. 10 shows a cross-sectional view of a step of a method of forming a cooling passage according to embodiments of the disclosure.

In another embodiment, shown in FIG. 10, metal cap element material 236 may be added directly into place extending across external section 254 (FIG. 7) of diffuser area 226 of opening 220 (not as a preformed cap element). That is, metal cap element material 236 is added into place including projection 244. This process may include, for example, brazing or welding. Metal cap element material 236 may include any metal or metal alloy compatible with component wall 210.

Referring to FIG. 8 for example, a turbine component 200 formed according to embodiments of the disclosure may include component wall 210 with internal surface 212 and external surface 214, and cooling passage 240. As noted, cooling passage(s) 240 may be used anywhere necessary in component wall 210 for cooling turbine component 200. Cooling passage 240 includes an opening 270 defining metering section 222 extending from internal surface 212 to metering end 224, and defining an inner portion 272 of diffuser section 242 that extends from metering section 222 to external surface 214. As described, diffuser section 242 is created by adding metal cap element material 236 into diffuser area 226 according to any of the various embodiments described herein. Metal cap element material 236, regardless of form, closes a portion of opening 220, e.g., external section 254 (FIG. 6) of diffuser area 226 of opening 220, leaving an exit 278 through which coolant can pass across external surface 214. Metal cap element material 236 (regardless of form) includes projection 244 extending internally of external surface 214 of component wall 210 to define internally facing section 246 of diffuser section 242.

As noted herein, relative to FIG. 5, turbine component 200 may have metering section 222 directed in a downstream direction of a working fluid flow across external surface 214 (i.e., with arrow), and diffuser section 242 may also be directed in a downstream direction of the working fluid flow across external surface 214. Such an arrangement has a downstream side 230 of metering section 222 meet an inner side 232 of (now) diffuser section 242 at an obtuse angle α. In contrast, as described relative to FIGS. 7-9, metering section 222 may directed in an upstream direction of a working fluid flow across the external surface, i.e., against the arrow, and diffuser section 242 may directed in a downstream direction of the working fluid flow across external surface 214, i.e., with the arrow. Such an arrangement has downstream side 230 of metering section 222 meet inner side 232 of (now) diffuser section 242 at an acute angle β. Where provided, metering section 222 intersecting diffuser section 242 at angle at or below 90° acts to spread coolant better compared to the FIG. 5 arrangement. This arrangement is also beneficial for packaging, and creating high heat transfer on the surface, providing an additional cooling benefit.

Figure 11:
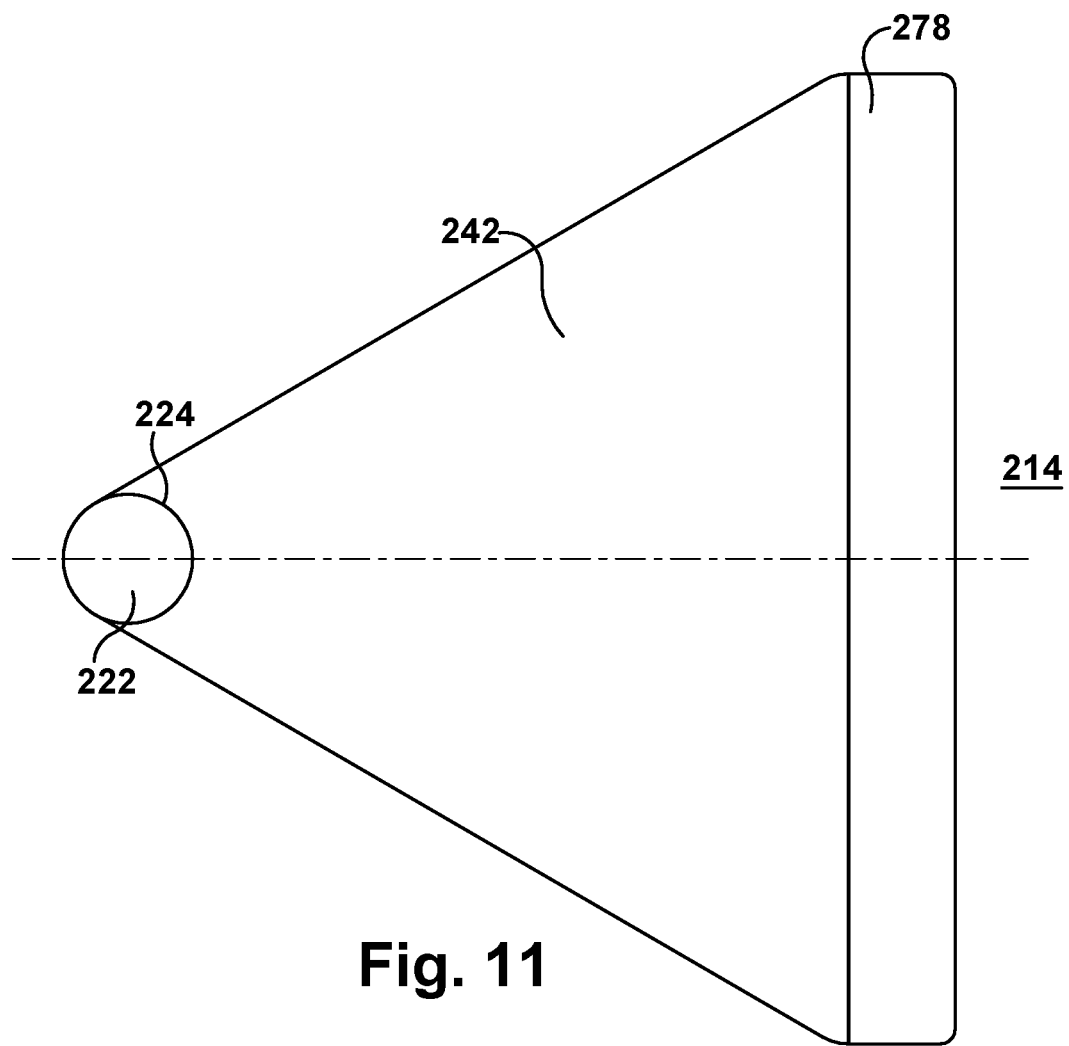
FIG. 11 shows a cross-sectional view along line 11-11 in FIG. 8 of a step of a method of forming a cooling passage according to embodiments of the disclosure.

Projection 244 and internally facing section 246 can also be shaped and sized to customize diffuser section 242. Various shapes are shown in the drawings. Projection 244 is not a discrete structure, but extends across the entire width of diffuser section 242. Diffuser section 242 and also exit 278 size and shape can be customized using processes according to the disclosure. As shown in for example FIG. 8, diffuser section 242 includes a first cross-sectional area at metering end 224 that is different than a second cross-sectional area of thereof at external surface 214. As shown in FIG. 8 and the cross-sectional view of FIG. 11 along line 11-11 in FIG. 8, the first cross-sectional area of diffuser section 242 at metering end 224 may be smaller than the second cross-sectional area of diffuser section 242 at external surface 214. This may be the case in a first, vertical plane, shown in FIG. 8, and in a second plane extending through component wall 210, as shown in FIG. 11. In this case, diffuser section 242 is directed in a downstream direction of a working fluid flow across external surface, and includes an inner, narrower end meeting metering end 224 and an outer, wider end, i.e., at exit 278 (FIGS. 8 and 11) at external surface 214.

Figure 12:
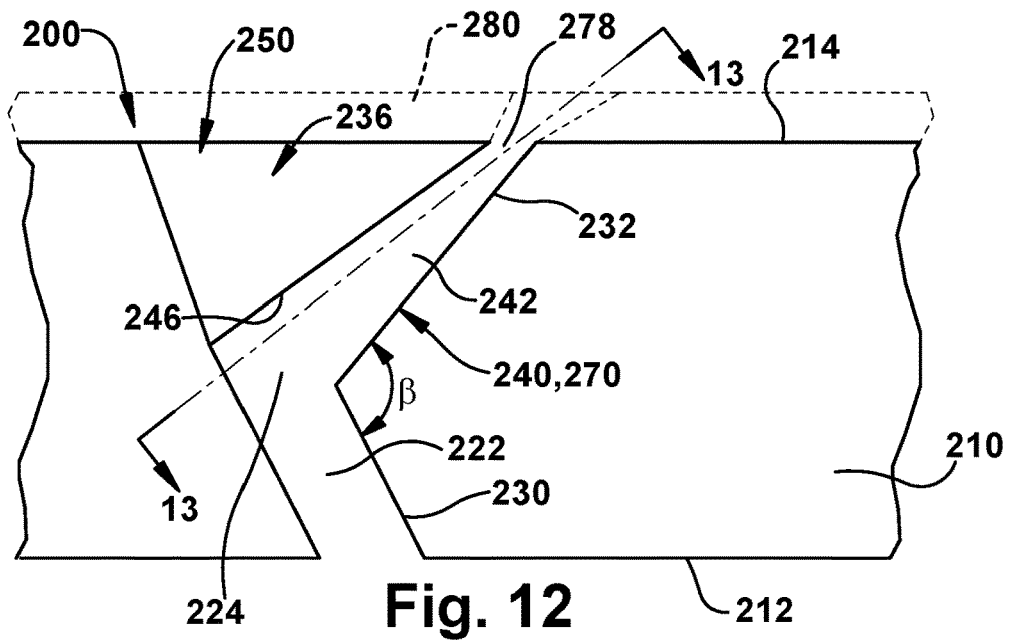
FIG. 12 shows a cross-sectional view of a step of a method of forming a cooling passage according to embodiments of the disclosure.
Figure 13:
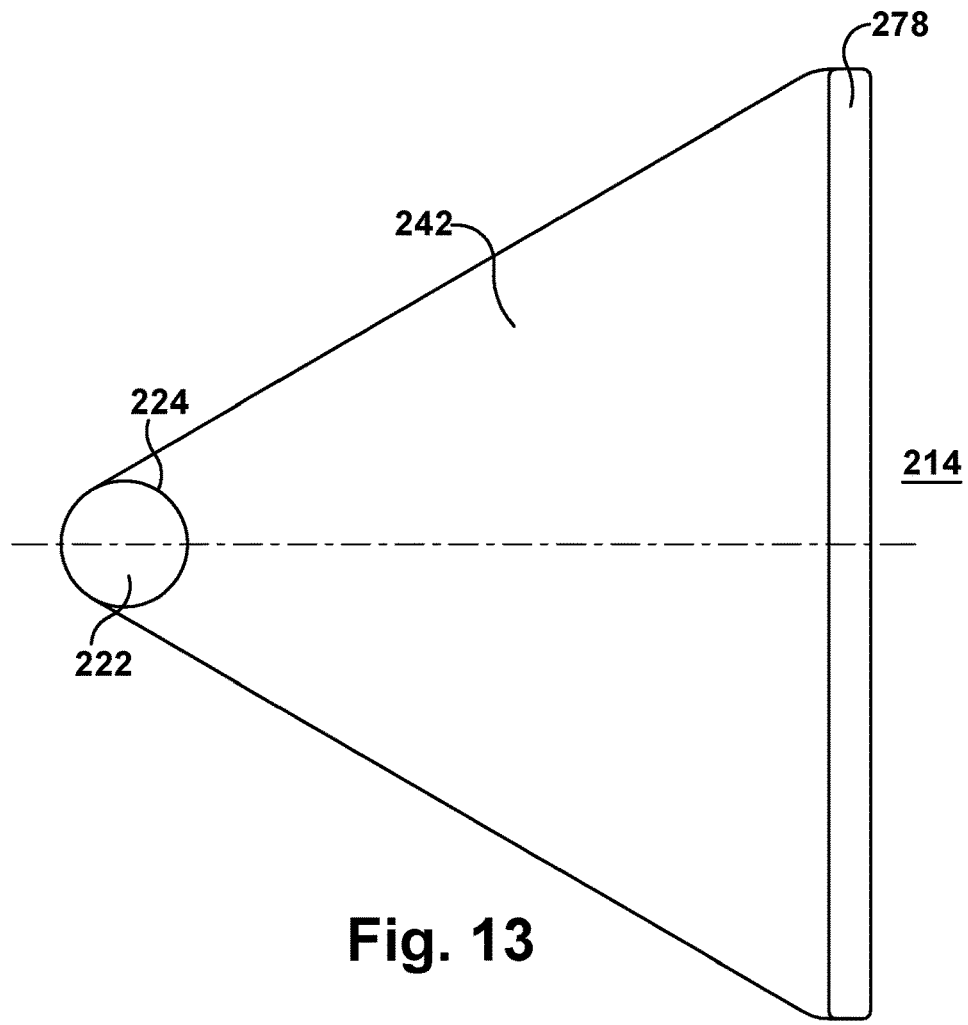
FIG. 13 shows a cross-sectional view along line 13-13 in FIG. 12 of a step of a method of forming a cooling passage according to embodiments of the disclosure.

With reference to FIGS. 12 and 13, in another non-limiting example, diffuser section 242 may include, in a first plane, e.g., plane shown in FIG. 12, an inner, wider end meeting metering end 224 and an outer, narrower end at external surface 214, e.g., exit 278. In contrast as shown in FIG. 13, in a second plane, perpendicular to the first plane of FIG. 12, diffuser section 242 may include an inner, narrower end meeting metering end 224 and an outer, wider end (i.e., exit 278) at external surface 214.

Exit 278 can also be shaped and sized to customize coolant flow characteristics. Note, as can be observed by comparing exit 278 in FIGS. 11 and 13, exit 278 can be made to have a variety of sizes.

Any of the afore-described embodiments may also include applying a ceramic coating 280 (shown in phantom in FIG. 12 only) over external surface 214. Ceramic coating 280 may include, for example, a bond coat layer, where necessary, and a thermal barrier coating (TBC) layer, or TBC layer alone. The bond coat layer may include any now known or later developed bond coat material such as but not limited to: nickel or platinum aluminides, nickel chromium aluminum yttrium (NiCrAlY), or nickel cobalt chromium aluminum yttrium (NiCoCrAlY). The TBC layer may include any now known or later developed TBC material such as but not limited to: yttria-stabilized zirconia (YSZ), mullite, and alumina. Ceramic coating 280 may include additional layers also such as a thermally grown oxide. Ceramic coating 280 may be applied to maintain exit 278 open therethrough, e.g., by application of a fluid flow through exit 278 during application, or it may close exit 278 creating an adaptive cooling scheme, i.e., one in which cooling passage 240 is operational upon removal of ceramic coating 280 at exit 278 by, for example, excessive heat or a spall in ceramic coating 280.

Figure 14:
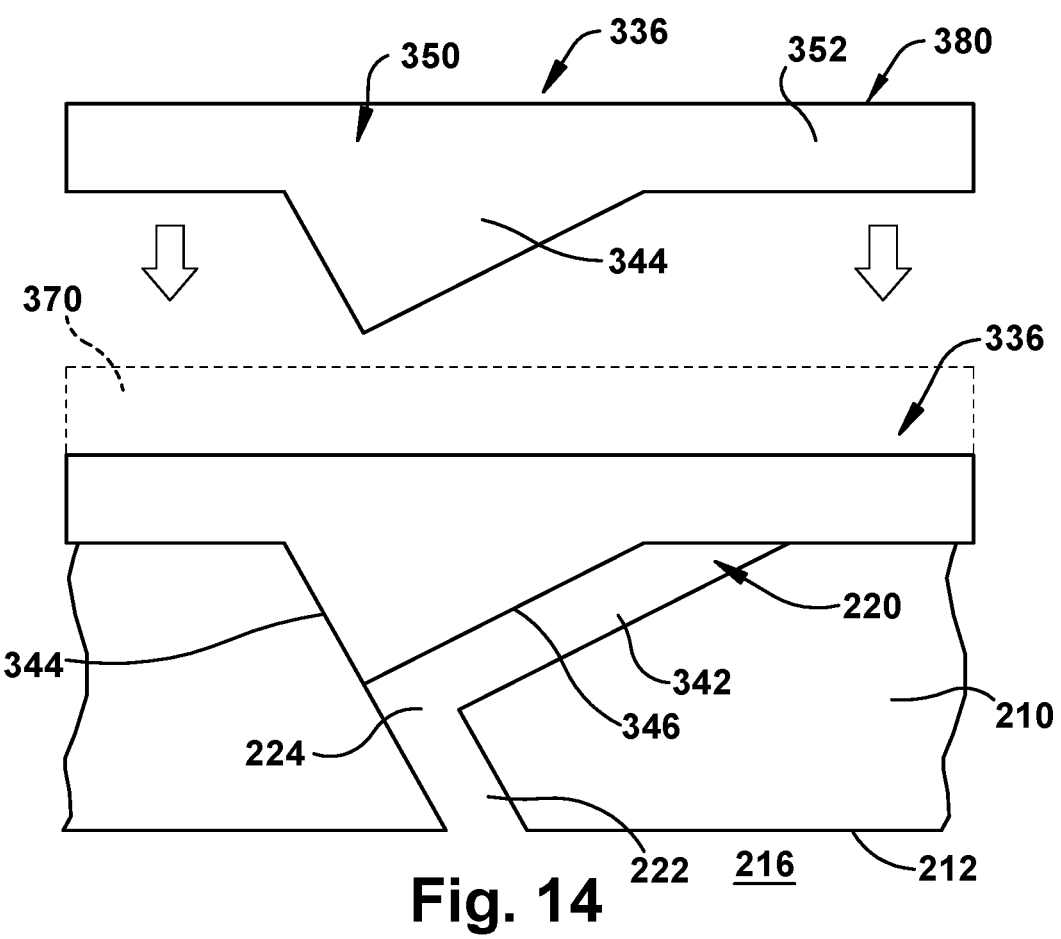
FIG. 14 shows a cross-sectional view of a step of a method of forming a cooling passage according to alternative embodiments of the disclosure.
Figure 15:
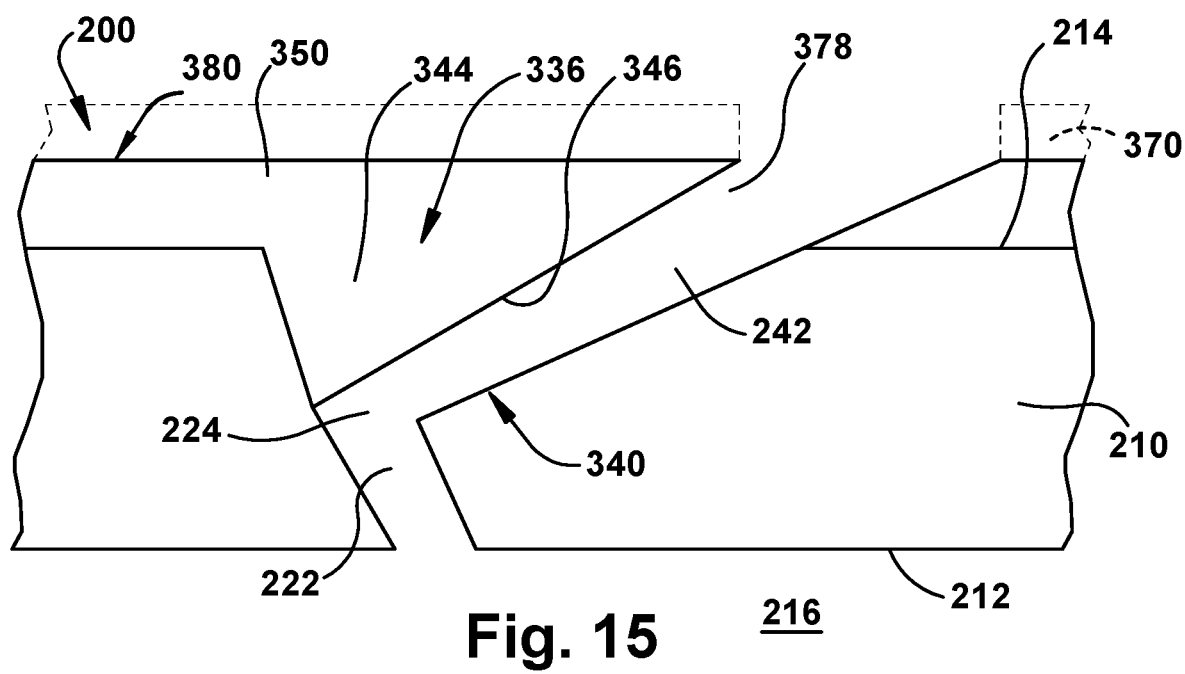
FIG. 15 shows a cross-sectional view of a step of a method of forming a cooling passage according to alternative embodiments of the disclosure.
Figure 16:
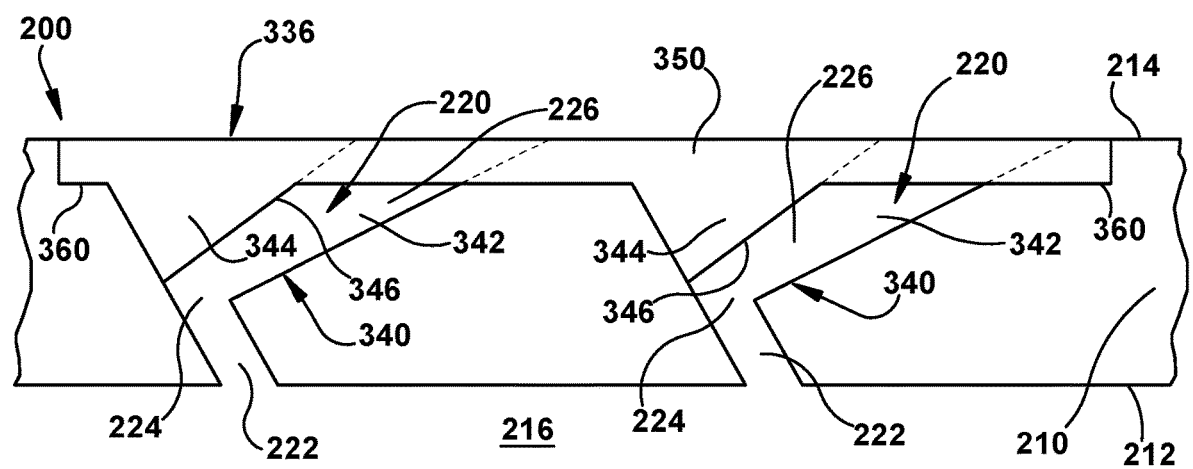
FIG. 16 shows a cross-sectional view of a step of a method of forming a cooling passage according to alternative embodiments of the disclosure.

Referring to FIGS. 14-16, cross-sectional views of another embodiment of a method of forming a cooling passage on a turbine component is illustrated. In this embodiment, opening 220 is formed similarly to that described relative to earlier embodiments. In FIG. 16, more than one opening 220 is shown. Opening 220 has the FIG. 6 form, but could be any form as described herein. As shown in FIG. 6, opening 220 passes through component wall 210 and fluidly connects internal surface 212 and external surface 214. Opening 220 includes metering section 222 extending from internal surface 212 to metering end 224, and diffuser area 226 extends from metering end 224 toward external surface 214. As shown only in the example of FIG. 16, but applicable to any of embodiments of FIGS. 14-16, opening 220 forming may include forming a cap element seat 360 about diffuser area 226 at external surface 214.

In contrast to FIGS. 7-13, in this embodiment as shown in FIG. 14, adding metal cap element material 336 closes diffuser area 226 of opening 220 at external surface 214 and defines a diffusion section 342 extending from metering end 224 to external surface 214 (and inner side of metal cap element material 336). Metal cap element material 336 includes a projection 344 extending internally of external surface 214 of component wall 210 and into diffuser area 226 to define an internally facing section 346 of diffusion section 342. Metal cap element material 336 can be formed using any of the methods described relative to FIGS. 7-13. For example, it may be formed by: coupling a backing element and adding the projection by brazing and/or additive manufacturing, adding a preformed metal cap element including the projection, or adding the metal cap element material through brazing and/or additive manufacture, etc. For purposes of description of this alternative embodiment, as shown in FIGS. 14 and 15, metal cap element material 336 may include metal backing element 352 having projection 344 coupled thereto. In an optional embodiment, shown in phantom in FIGS. 14-15, embodiments of the method may further include applying a ceramic coating 380 over metal backing element 352 prior to coupling it across openings 220. Ceramic coating 380 (not shown separately) may include any of the afore-described layers and materials.

Where cap element seat 360 (FIG. 16 only) is provided, adding metal cap element material 336 may include adding a metal cap element 350 in cap element seat 360 to close diffuser area 226 of opening 220 at external surface 214. Otherwise, metal cap element 350 can mount directly to external surface 314.

FIG. 15 shows various forms of allowing a section of metal cap element material 336 (i.e., from opening 220 at external surface 214) to be removed to form cooling passage 340. When material 336 is removed, cooling passage 340 extends through metal cap element material 336 and component wall 310 (and any ceramic coating 380, if provided) to fluidly connect internal surface 212 and external surface 214. In one embodiment, allowing the section of cap element material 336 to be removed includes machining a hole through ceramic coating 380, if provided, and metal backing element 352. The machining may include any now known or later developed process for opening a hole, e.g., drilling, grinding, etching, etc. (It is noted that ceramic coating 380 can alternatively be applied after exit 378 formation to close it or leave it open). In another embodiment, allowing the section of cap element material 336 to be removed includes allowing a hole to form through ceramic coating 380 (if provided) and metal backing element 352 to diffuser section 342 during operation of turbine component 200. This latter adaptive cooling process may allow for cooling only where environmental conditions require, e.g., sufficient heat to remove ceramic coating 380 and/or metal backing element 352 at opening 220, perhaps caused by a spall in ceramic coating 380.

FIG. 16 shows an embodiment in which opening 220 forming includes forming a plurality of discrete openings 220, and adding metal cap element material 336 includes adding the metal cap element material to close the diffuser area 226 of each of the plurality of openings 220 at the external surface 214. Here, allowing the section of the metal cap element material 336 to be removed to form cooling passage 340 occurs at one or more of the plurality of openings. While the use of multiple openings 220 is shown only with the FIGS. 14-16 embodiments, it is understood that the teachings of the FIGS. 7-13 embodiments can also be applied to a plurality of openings 220.

Embodiments of the disclosure provide a turbine component, e.g., airfoil, blade and/or nozzle, having component wall with increased cooling effectiveness, allowing the turbomachine in which employed to be more efficient through increased firing temperature or overall reducing coolant usage. Embodiments of the disclosure provide a diffuser section for a cooling passage that can have geometric shapes that would normally need line of sight and would be limited in the variety of shapes possible. Embodiments thus allow one to make any form of diffuser section shape without line of sight and without additive manufacturing. The turbine component can be built with cooling passages open or configured, perhaps with a ceramic coating, to enable adaptive cooling, e.g., opening only when environmental conditions require such as high temperature or a ceramic coating spall. The cooling effectiveness of the cooling passages described herein are higher than conventional passages. The improved effective cooling provided can extend part life through reductions in metal temperature and decreased likelihood of TBC spallation. Thus, embodiments of the disclosure can also reduce the likelihood of unplanned outages and increase the duration of time in which parts need to be repaired. Cooling passage surface area may be larger than traditional holes in all embodiments, which also increase an internal cooling. The teachings of the disclosure are especially advantageous for a leading edge wall of an airfoil, but can also be applied elsewhere on the airfoil.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−5% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of forming a cooling passage on a turbine component having a component wall with an internal surface and an external surface, the method comprising:
   forming an opening passing through the component wall and fluidly connecting the internal surface and the external surface, the opening including a metering section extending from the internal surface to a metering end, and a diffuser area extending from the metering end to the external surface; and
   adding a preformed metal cap element across a portion of the diffuser area of the opening to close the portion of the diffuser area to form the cooling passage with a diffuser section extending from the metering end to the external surface, the preformed metal cap element including a projection extending internally of the external surface of the component wall and into the diffuser area to define an internally facing section of the diffuser section, wherein adding the preformed metal cap element changes a direction of a flow of a working fluid within the cooling passage, wherein the working fluid is configured to flow within the metering section in a first direction, and the working fluid is configured to flow within the diffuser section in a different second direction, wherein the first direction and the second direction are separated from each other by an acute angle,
   wherein the cooling passage extends through the component wall and fluidly connects the internal surface and the external surface.

2. The method of claim 1, wherein the preformed metal cap element includes a backing element extending across an external section of the diffuser area of the opening, and
   the adding of the preformed metal cap element further includes adding an additional metal cap element material to the backing element within the diffuser area to form the projection on the backing element.

3. The method of claim 1, wherein the preformed metal cap element includes a backing element and the projection extending from the backing element.

4. The method of claim 1, further comprising, prior to the adding the preformed metal cap element, forming at least a portion the preformed metal cap element by at least one of: brazing, additively manufacturing and machining.

5. The method of claim 1, wherein the forming the opening includes forming a metal cap element seat about a portion of the diffuser area at the external surface, wherein the preformed metal cap element seats in the metal cap element seat during the attaching.

6. The method of claim 1, wherein the first direction is an upstream direction and the second direction is a downstream direction, wherein adding the preformed metal cap element changes the direction of the flow of the working fluid between the upstream direction and the downstream direction, and
   wherein a downstream side of the metering section meets an inner side of the diffuser section at the acute angle.

7. The method of claim 1, wherein the diffuser section includes, in a first plane, an inner, narrower end meeting the metering end and an outer, wider end at the external surface.

8. The method of claim 7, wherein the diffuser section includes, in a second plane perpendicular to the first plane, an inner, wider end meeting the metering end and an outer, narrower end at the external surface.

9. A method of forming a cooling passage on a turbine component having a component wall with an internal surface and an external surface, the method comprising:
   forming an opening passing through the component wall and fluidly connecting the internal surface and the external surface, the opening including a metering section extending from the internal surface to a metering end, and a diffuser area extending from the metering end toward the external surface;
   adding a metal cap element material to close the diffuser area of the opening at the exterior surface to form the cooling passage, a diffuser section extending from the metering end to the external surface, the metal cap element material including a projection extending internally of the external surface of the component wall and into the diffuser area to define an internally facing section of the diffuser section, wherein adding the metal cap element changes a direction of a flow of a working fluid within the cooling passage, wherein the working fluid is configured to flow within the metering section in a first direction, and the working fluid is configured to flow within the diffuser section in a different second direction, wherein the first direction and the second direction are separated from each other by an acute angle; and
   wherein the cooling passage extends through the component wall and fluidly connects the internal surface and the external surface.

10. The method of claim 9, wherein the forming the opening includes forming a cap element seat about the diffuser area at the external surface, and adding the metal cap element material includes adding a metal cap element in the cap element seat to close the diffuser area of the opening at the exterior surface, the metal cap element including the projection.

11. The method of claim 9, wherein the adding the metal cap element material includes at least one of the following to close the diffuser area of the opening:
    attaching the metal cap element material; or
    additively manufacturing the metal cap element material.

12. The method of claim 9, wherein:
    the forming the opening includes forming a plurality of discrete openings;
    the adding metal cap element material includes adding the metal cap element material to close the diffuser area of each of the plurality of openings at the exterior surface; and
    the allowing the section of the metal cap element material to be removed to form the cooling passage occurs at at least one of the plurality of openings.

13. The method of claim 9, wherein the metal cap element material includes a metal backing element having the projection coupled thereto, and further comprising applying a ceramic coating over the metal backing element.

14. The method of claim 13, wherein the allowing the section of the cap element material to be removed includes machining a hole through the ceramic coating and the metal backing element.

15. The method of claim 13, wherein the allowing the section of the cap element material to be removed includes allowing a hole to form through the ceramic coating and the metal backing element to the diffuser section during operation of the turbine component.

* * * * *